United States Patent [19]

Hitchings

[11] Patent Number: 5,124,040
[45] Date of Patent: Jun. 23, 1992

[54] CARBONACEOUS COATING FOR REFRACTORY FILTERS OF LIQUID METALS

[76] Inventor: Jay R. Hitchings, 1393 Piedmont Dr., Downingtown, Pa. 19335

[21] Appl. No.: 351,661

[22] Filed: May 15, 1989

[51] Int. Cl.$^5$ .............................................. B01D 37/02
[52] U.S. Cl. .................................. 210/639; 210/502.1; 210/507; 210/767; 264/29.1
[58] Field of Search .............................. 264/29.5, 29.1; 427/228, 247, 244, 407.2; 210/506, 507, 508, 502.1, 767, 639; 164/358; 75/407, 408, 409, 410, 411, 412

[56] References Cited

U.S. PATENT DOCUMENTS 3,444,276  5/1969  Olstowski et al. .............. 264/29.1 X
4,627,944  12/1986  Murakami et al. ............. 264/29.1 X
4,985,316  1/1991  Bose et al. ...................... 264/29.1 X

*Primary Examiner*—Frank Spear
*Attorney, Agent, or Firm*—Charles S. Knothe

[57] ABSTRACT

This invention discloses a process for making a refractory filter for liquid ferrous and non-ferrous metal with improved priming action. A carbonaceous resin onto the surfaces of a hard-fired ceramic or refractory cloth filter for liquid metal which protects the filter against abrasion and the absorption of water and also holds and protects particulate additives in place on the surface of the filter where they can later react with the liquid metal. When the liquid metal approaches and then touches the surface of the filter, the resinous coating chars. The resulting porous layer of mechanically strong carbon retards heat transfer from the hot liquid metal to the otherwise unheated filter, aiding the priming of the filter and also controlling the rate of dissolution of the particulate additives into the liquid metal. The preferred resin has a high char-forming tendency and a mechanically strong porous carbon coating on the filter when the filter is exposed to the hot, liquid metal.

8 Claims, No Drawings

CARBONACEOUS COATING FOR REFRACTORY FILTERS OF LIQUID METALS

BACKGROUND OF THE INVENTION

This invention relates to a process for making a refractory filter for liquid ferrous and non-ferrous metal with improved priming action.

Rigid ceramic filters support themselves by being thick enough to resist the bending forces exerted upon them by the pressure drop of the liquid metal flowing through the filter. They are also made thick so that they may act as depth filters. However, the resulting large thermal mass requires that the liquid metal be substantially superheated to a temperature well above its liquidus (the temperature above which no solids are stable).

Flexible, fibrous filters made from refractory filaments or yarn are difficult to handle because of their inherent flexibility. They support the pressure of the liquid metal by generating membrane forces, changing into three-dimensionally curved shapes. This requires that they be firmly clamped around the periphery. In order to be clamped successfully between the two halves (cope and drag) by the sand mold they must be rough-surfaced and rigid, and their warp and woof must be bonded together to prevent unraveling at the edges.

Particulate additives are often placed in the mold so as to act as lately as possible during the casting process (U.S. Pat. No. 3,703,922, November/1972, C. M. Dunks and J. L. McCaulay). This minimizes fading of the benefits of the additions during the time lag between application of the addition and freezing of the liquid metal. However, there may not be sufficient mixing of the inoculant with the incoming metal because the inoculant, located at the bottom of the pouring basin, is not approached very closely by all of the liquid metal, and because a metal skin freezes promptly upon contact with the mold walls, before the liquid metal has had a chance to mix by turbulent flow inside the runners and mold cavity.

Ease of priming is a desired attribute of a filter; priming is the initial penetration of the relatively cold filter by the hot liquid metal. It is essential that the first liquid metal striking the filter not lose so much superheat that it freezes against the filter, because if that happens no more liquid can pass through the filter, ruining the cast by preventing filling of the mold. Priming is improved by a filter with large openings and small depth, small thermal mass, and slow heat transfer or low heat conductivity in the filter material. The performance of the filter is better if it has smaller openings and greater depth (for deep-bed filters), however, and so it is essential that heat loss from the liquid metal to the filter be minimized by insulating the filter from the liquid metal. It may not be possible to modify the heat-flow characteristics of the filter material, and so a coating that can retard heat transfer is of great value in improving priming.

Soot deposited from a smoky flame has long been used as a mold coating (particularly for metal molds), because it prevents sticking between the mold and the casting, and it reduces thermal shock to the mold. A ceramic coating has been placed on a molybdenum metal screen to prevent reaction between the screen and the metal being filtered (U.S. Pat. No. 3,598,732, August/1971, D. W. Foster and W. G. Scholz). A resinous chill wash has been used to prevent sticking of the chill to the casting; the object of this invention (U.S. Pat. No. 2,816,336, December/1957, P. J. Neff) was to interpose a thin layer of evolving gas between the chill and the casting.

A mold wash has been patented (U.S. Pat. No. 3,115,414, December/1963, N. M. Lottridge, Jr. and D. G. McCullough), consisting of finely pulverized mica and wood flour in a liquid carrier, and which was intended to increase the fluidity of molten cast metals by retarding heat transfer from the liquid metal to the mold. This invention was limited to less than 50 percent carbonaceous solids (pitch plus wood flour) in the coating composition, because mica or vermiculite was to be the primary insulating component.

Pyrolytic graphite (U.S. Pat. No. 3,284,862, November/1956, W. H. Schweikert) has been applied to metal molds as a substitute for solid graphite or metal molds; it functions as an insulator because of the highly anisotropic heat conductivity of pyrolytic graphite, making the coating an insulator against the flow of heat perpendicularly into the mold surface.

Acenaphthylene (U.S. Pat. No. 3,692,550, September/1972, R. E. Melcher and R. W. Somers) has been used as a bulk additive to molding sand to prevent adherence (burn-on) of sand particles to a casting surface because upon exposure to the liquid metal it (a) forms a refractory, graphite-like coating on the exposed sand particles or (b) simply volatilizes and redeposits deeper within the sand without bonding the sand to the casting.

SUMMARY OF INVENTION

This invention is a process for making a refractory filter for liquid ferrous and non-ferrous metals with improved priming action. A carbonaceous coating is deposited on the surface of the filter which holds and protects particulate metal additives such as ferroalloys, grain refiners, master alloys, deoxidizers and inoculants and improves the priming action of both hard-fired rigid ceramic and flexible refractory cloth filters. The carbonaceous coating acts as a stiffening agent for cloth filters which are used in the filtration of liquid metals including cast iron, copper alloys and other non-ferrous metals. The coating is a carbon-based resin or mixture of resins, which has a high char-forming tendency with minimal deformation during pyrolysis so that it converts to porous, non-graphitic carbon upon first exposure to the hot liquid metal and this carbon is mechanically strong and slow to dissolve in the liquid metal. The resin is cured by aging or page artificially heating to stiffen the filter and stabilize the coating by polymerization of the resin and evaporation of the solvents or products of polymerization.

DESCRIPTION OF THE PREFERRED EMBODIMENTS

A carbon-based resin or resins are deposited on the surface of the filter. The coating has two embodiments: Firstly, it is hydrocarbon resin (or mixture of resins) which protects the exposed surfaces of the filter and which can also act as an adhesive to hold particulate additives (such as deoxidizers, ferroalloys, grain refiners, inoculants, and master alloys) and which also protects the filter and particles against abrasion and moisture during manufacture, shipment, and storage. The coating can also stiffen or size a fibrous cloth filter. Secondly, upon exposure to the hot liquid metal the resinous coating chars, giving off some gaseous components but retaining most of its carbon in the form of a porous elemental carbon coating on the filter. The elemental carbon is especially useful for this second form of the coating because it is not wet by liquid ferrous metal (making it slow to dissolve and slow to transfer heat electronically), and because it is not soluble in molten aluminum or copper alloys. The strong, porous carbon coating insulates the filter against the flow of heat from the liquid metal, improving the priming of the filter and reducing the degree of superheat needed to maintain the fluidity of the liquid metal.

During the thermal degradation of a polymer, it tends to give off gases and leave a carbonaceous residue. Some polymers leave more of the carbonaceous residue; the most desirable property of the hydrocarbon resin for use as a filter coating is this char-forming tendency. The charforming tendency (CFT) is a function of the structure of the component functional groups (D. W. Van Krevelen, "Thermal Decomposition," in Properties of Polymers, Elsevier, New York (1976), pp. 459-466). The greater the CFT, the greater the fraction of its weight remains in the residue as carbon.

The properties of the char (the remaining carbon residue) are further enhanced in the present application if the char is rigid and porous. To so form, the intermediate decomposition product, called mesophase (H. Marsh and C. Cornford, "Mesophase: The Precursor to Graphitizable Carbon," in Petroleum Derived Carbons, M. L. Deviney, ed., American Chemical Society, Washington, D.C. (1976), pp. 266-281), which forms during the pyrolysis, should be nondeforming (non-coalescing). What we want is essentially the opposite of what is advantageous for the production of carbon fiber, graphitic carbon, and needle coke (J. H. White, "Mesophase Mechanisms in the Formation of the Microstructure of Petroleum Coke," in Petroleum Derived Carbons, M. L. Deviney, ed., American Chemical Society, Washington, D.C. (1976), pp. 266-281).

The property of non-coalescence of the mesophase particles during pyrolysis is aided if the molecules of the liquid-crystal mesophase become cross-linked. H. Marsh and C. Cornford teach that cross linking is facilitated by heterocyclic, substituted, unsaturated, non-planar molecules. Further they show additions of a cross-linking agent can even be made to the precursor resin to make the mesophase non-coalescing. Cellulose, phenolics, and sugar are excellent examples of polymers which form strong, porous chars. Branched (low-density) poly(ethylene), poly(propylene), poly(methyl acrylate), poly(vinyl acetate), and poly(vinyl alcohol) are other good candidates.

The application of the coating to a filter is made by dipping or spraying; the amount used must be sufficient to achieve the desired priming performance without closing off the openings in the filter. A solvent can be used to adjust the viscosity of the resin to achieve these ends but is not essential.

Any particulate additives that are to be used on the filter can be sprinkled or imprinted upon (or into) the coating while it is still tacky. The depth to which the particulates are embedded in the resin coating will control the rate with which they dissolve in the liquid metal. The resinous coating also serves to prevent direct contact between the particulate additives and the filter material.

The particulates can be further coated or sealed with a second, protective layer of resin (which need not be the same as the first coating); however, it is essential that the particulates not be prevented from dissolving in the liquid metal. Different additives can be placed in various parts of the filter (in layers, along the sides of the openings, or on the upstream vs. the downstream faces), depending on the functions of the additives.

The resin is then dried or cured to harden it and to reduce the amount of gaseous decomposition products which will be given off during the use of the filter. The coating should not be pyrolized at this stage, because that would reduce the protection which the coating affords the filter against abrasion and absorption of water.

The filter is then placed in the mold so that all of the liquid metal must first pass through the filter before entering the shaped cavity which is to become the casting. The first liquid metal to contact the upstream face of the filter, begins to pyrolize and char the resinous coating, driving off the gaseous components, which then pass into the surrounding sand or vents in the mold cavity.

The surface tension of the liquid metal prevents it from penetrating the filter until a sufficient metallostatic head has been developed by accumulation of the liquid metal against the upstream face of the filter. The charred coating performs its essential role as an insulator at this stage; if heat transfer from the liquid metal to the filter were not retarded at this stage, the liquid metal might freeze against the filter, forming an impenetrable skin. The thin layer of char on the particulate additives prevents them from prematurely reacting with the first bit of liquid metal.

Once there is enough back pressure for the liquid metal to flow through the filter, the char within the pores of the filter prevents the finely divided streams of liquid metal from freezing off within the pores. Once a significant amount of liquid metal has flowed through the filter, it will have been heated sufficiently for the insulating properties of the char coating to be no longer needed. The insulating property of the carbon coating reduces the degree of superheat required to ensure passage of this first liquid metal through the filter, thereby reducing the superheat required for the entire quantity of metal in the ladle, because it is impractical to increase the superheat of just a small portion of that quantity added to each successive mold in the group fed from that ladle. This realizes a significant saving in energy as well as an improvement in the metallurgical quality of the liquid metal, because higher temperatures increase the rates of the adverse chemical reactions in the ladle.

The particulate additives will be gradually dissolved as the char partially surrounding them is dissolved. This retardation of the dissolution of the particulate additives proportions their effects among the entire batch of liquid metal entering the mold, minimizing the degree of mixing required to distribute the additives uniformly within the casting.

EXAMPLES OF RESIN COATINGS ON FILTERS 1-a. A 3.5 by 3.5 by half-inch thick hard-fired ceramic filter for molten metal was coated with a phenol formaldehyde resin containing sixty percent solids. The filter was then heated to 300° C. for five minutes to cure and harden the resin coating. After cooling the filter was examined microscopically; it was determined that the surface of the filter was covered with a hard, continuous coating.

1-b. Two 3.5 by 3.5 by half-inch thick hard-fired ceramic filters were placed into the runner system of a green sand mold. One of the filters was prepared as per example 1-a and the other had no treatment or preparation. The runner system was shaped like a "Y" so that each filter was in a different leg of the "Y" and the incoming molten metal would enter the common leg. A total of 278 pounds of molten gray iron at a temperature of 2456° F. was poured into the mold in 34 seconds. Each filter passed approximately 120 pounds of metal during the pour.

Examinations of each filter after the metal solidified showed that the untreated filter had a brown-white color and that several pores or channels around its edges but still exposed to molten metal, were only partially filled with metal. The treated filter had a shiny black color and every single pore or channel exposed to the molten metal was completely full of metal.

2. A four by four inch square section of woven refractory cloth filter material was coated with a phenol formaldehyde resin containing sixty percent solids. This filter was then heated to 300° C. for 3.5 minutes, cooled and examined. All of the threads and fibers that make up the cloth were found to have a hard, continuous coating which made the cloth filter become hard and rigid.

2-a. A four by four inch square section of woven refractory cloth filter material, prepared as for Example #2, was placed into the runner system of a green sand mold. The filter was held at the parting line between the cope and drag sections of the mold. This configuration allowed a circular, two-inch diameter central portion of the filter to be available for filtering. A total of 278 pounds of molten gray cast iron at 2478° F. was poured through this filter in twenty-eight seconds. A microscopic examination of the filter was performed after breaking open the encapsulating gating system. The examination revealed that even the smallest single fibers of the silica cloth now have a shiny, black carbon coating, every hole or orifice exposed to the liquid metal has passed metal through it and the metal has even penetrated through the individual threads and fibers of the cloth.

2-b. Another test was conducted like that in Example 2-a, except that the cloth filter was not coated with any resin; 269 pounds of molten metal at 2438° F. was poured through the filter in 32 seconds. The microscopic examination of this filter revealed that the filter now has a brown-white color and that not all of the orifices have passed molten metal. Also, the molten metal did not penetrate the individual threads or fibers of the cloth.

Laboratory tests showed that when molten iron at 2480° F. come in contact with refractory cloth coated with sugar (molasses), polyvinal alcohol or cellulose acetate that a carbon char formed on their surfaces.)

I claim:

1. A process for making a refractory filter for liquid ferrous and non-ferrous metals with improved priming action comprising;

depositing on the surface of the filter that will be exposed to the liquid metal a carbon-based resin or resins that has a high char-forming tendency with minimal deformation during pyrolysis so that it converts to porous, non-graphitic char upon first exposure to the hot liquid metal and is mechanically strong and slow to dissolve in the liquid metal;

curing the resin by aging or artificial heating to stiffen the filter and stabilize and coating by polymerization of the resin and evaporation of the solvents or products of polymerization.

2. The process of claim 1 wherein the depositing of the carbon-based resin on the surface of the filter is accomplished by spraying the resin onto the filter.

3. The process of claim 1, wherein the depositing of the carbon-based resin on the surface of the filter is accomplished by dipping the filter into the resin.

4. The process of claim 1, wherein the depositing of the carbon-based resin on the surface of the filter is accomplished by rolling the resin onto the filter.

5. The process of claim 1 wherein the depositing of the carbon-based resin on the surface of the filter is accomplished by painting the resin onto the filter.

6. The process of claim 1 wherein the resin can be further cured by heating so as to cause partial pyrolysis by driving off some of the more volatile fractions, thereby reducing subsequent gas evolution upon exposure to the hot liquid metal.

7. The process of claim 1 wherein particulate additives selected from the group consisting of ferroalloys, grain refiners, master alloys, deoxidizers and incoculants and mixtures thereof are sprinkled onto the resin coating while it is still tacky.

8. The process of claim 1 wherein particulate additives selected from the group consisting of ferroalloys, grain refiners, master alloys, deoxidizers and incoculants and mixtures thereof are sprinkled onto the resin coating while it is still tacky and an additional layer or resin is applied over the particulate additives.

* * * * *